United States Patent [19]
Koslow

[11] Patent Number: 5,464,533
[45] Date of Patent: Nov. 7, 1995

[54] SOLVENT CLEANING SYSTEM WITH TWO STAGE FILTER

[75] Inventor: Evan E. Koslow, Weston, Conn.

[73] Assignee: KX Industries, L.P., Orange, Conn.

[21] Appl. No.: 58,751

[22] Filed: Apr. 29, 1993

[51] Int. Cl.⁶ .................................................. B01D 35/027
[52] U.S. Cl. ...................... 210/257.1; 210/264; 210/440; 210/443; 210/508; 134/111
[58] Field of Search ..................................... 210/168, 264, 210/416.5, 440, 443, 508, 167, 257.1; 134/10, 11, 111

[56] References Cited

U.S. PATENT DOCUMENTS 5,151,180  9/1992  Giordano et al. ................... 210/264
5,247,876  9/1993  Wilson et al. ..................... 210/416.5

FOREIGN PATENT DOCUMENTS 455142  10/1936  United Kingdom ................ 210/416.5

Primary Examiner—Robert A. Dawson
Assistant Examiner—W. L. Walker
Attorney, Agent, or Firm—Parmelee, Bollinger & Bramblett

[57] ABSTRACT

A filtration system removes both particulate and dissolved matter from liquid cleaning solvent. The system is enclosed within a single unit which incorporates both a positive displacement pump and a filter assembly. The filter assembly includes a two stage filter with a hollow, cylindrical, activated carbon core which is connected to the intake side of the pump.

13 Claims, 6 Drawing Sheets 5,464,533

SOLVENT CLEANING SYSTEM WITH TWO STAGE FILTER

TECHNICAL FIELD

This invention pertains to the field of filtration. More specifically, it relates to a liquid filtration system with particular relevance to metal parts cleaning stations.

BACKGROUND ART

Essentially every metal-working shop includes a parts cleaning station for cleaning metal parts of grease, oil, and dirt. A typical station consists of a metal sink having a hinged safety cover and a drain. The sink sits on top of a reservoir which may be a 55, 30, or 16 gallon drum. The drum contains mineral spirits. A pump, which is immersed in the mineral spirits, pumps it through a hose to a spray nozzle, which is used to spray the part. The dirt-laden fluid then drains back into the drum. The heavy dirt particles settle to the bottom of the drum and the mineral spirits are constantly recirculated.

Approximately once a month a truck picks up the residual solvent, takes it away for recycling, and replaces it with clean solvent. The used solvent may be taken to a distillation center for recycling back to its original state. Often, however, it is merely sold for its fuel value and the heavy residues are disposed of as hazardous materials waste.

DISCLOSURE OF INVENTION

The present invention comprises a filtration system, which is adapted to fit within a standard 55, 30, or 16 gallon drum. It includes a filter through which the solvent is pumped to remove both dirt and dissolved petroleum molecules prior to passing to the spray head. As a result, the fluid is continuously being returned to its original pristine state.

Mineral spirits evaporate slowly, and approximately one-third of a reservoir's volume will evaporate over a one-month period to be replaced by clean make-up solvent. Accordingly, after three months of operation, there is essentially no original fluid left as it has all been replaced by make-up solvent. As a result, recycling is avoided. Instead, the filter is simply removed for burning or other suitable disposal and is replaced by a clean filter. Accordingly, it is only necessary to visit the site approximately once every three months. This results in a great saving of both transportation and recycling costs.

To achieve an effective and commercially useful system, it is important to allow simple and direct retrofit into the hundreds of thousands of existing parts cleaners, some of which are quite small and present difficult, space-limited situations. Accordingly, it is necessary to package the complete solvent purification and delivery unit into a specific space envelope and to take unique space saving steps. In this regard, the current invention includes a positive displacement pump installed directly into the filter assembly's head. This results in a single tall, thin structure that fits along the inside wall of an existing, installed reservoir. The invention also permits simple installation, consisting of placing the unit into an existing reservoir and making an electrical connection. Every element of the system is contained within the solvent reservoir and installation does not breach the integrity of the containment. The resulting geometry maximizes the available filtration capacity by retaining the maximum amount of space for the active filtration element.

An additional feature of this invention is that the filtration system may be designed to operate from the vacuum side of the pump. This is an important safety feature as the volatile mineral spirits are never under pressure. As a result, the potential for spillage, leakage, and release of high-pressure spray is virtually eliminated. The only leakage would be inward, not outward.

BEST MODE FOR CARRYING OUT THE INVENTION

Figure 1:
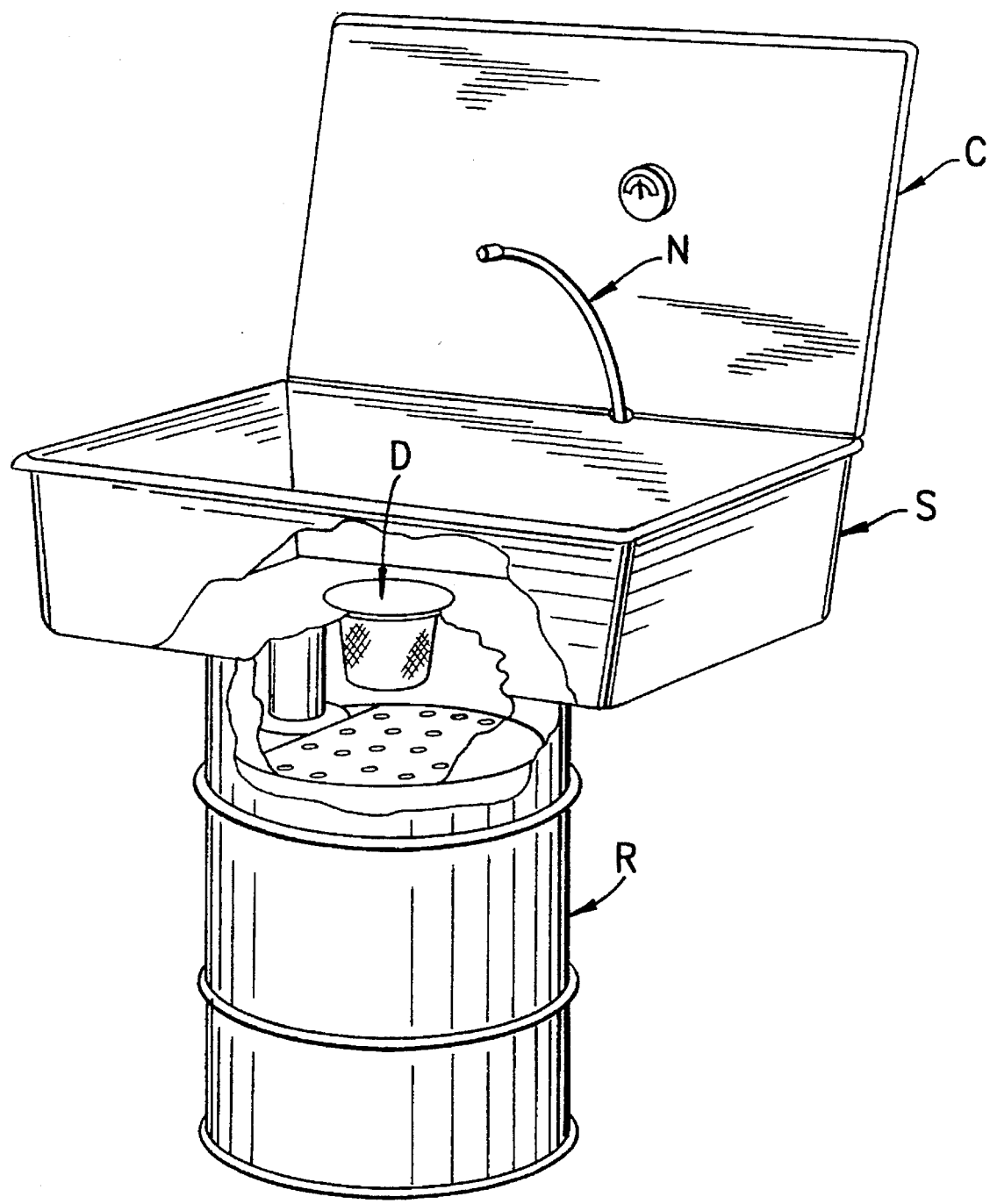
FIG. 1 is a perspective view of a parts cleaning station incorporating the present invention.

FIG. 1 illustrates the major external features of a parts cleaning station incorporating the filter system of this invention. It comprises a steel sink S having a hinged safety cover C, a spray nozzle N, and a drain D. The sink rests upon a reservoir R, which may be a drum containing the solvent.

Figure 2:
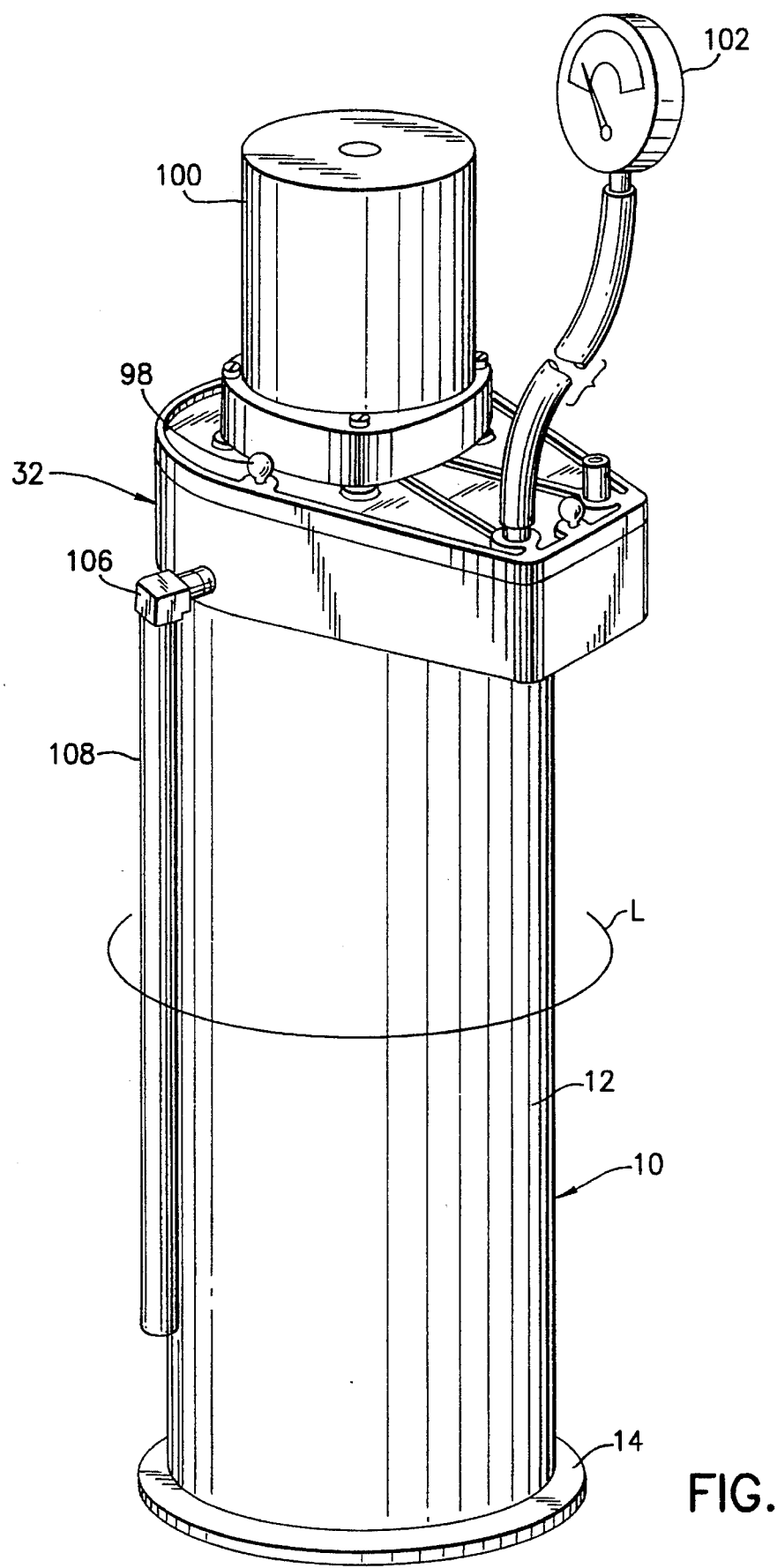
FIG. 2 is a perspective view of a filter system in accordance with the invention.
Figure 3:
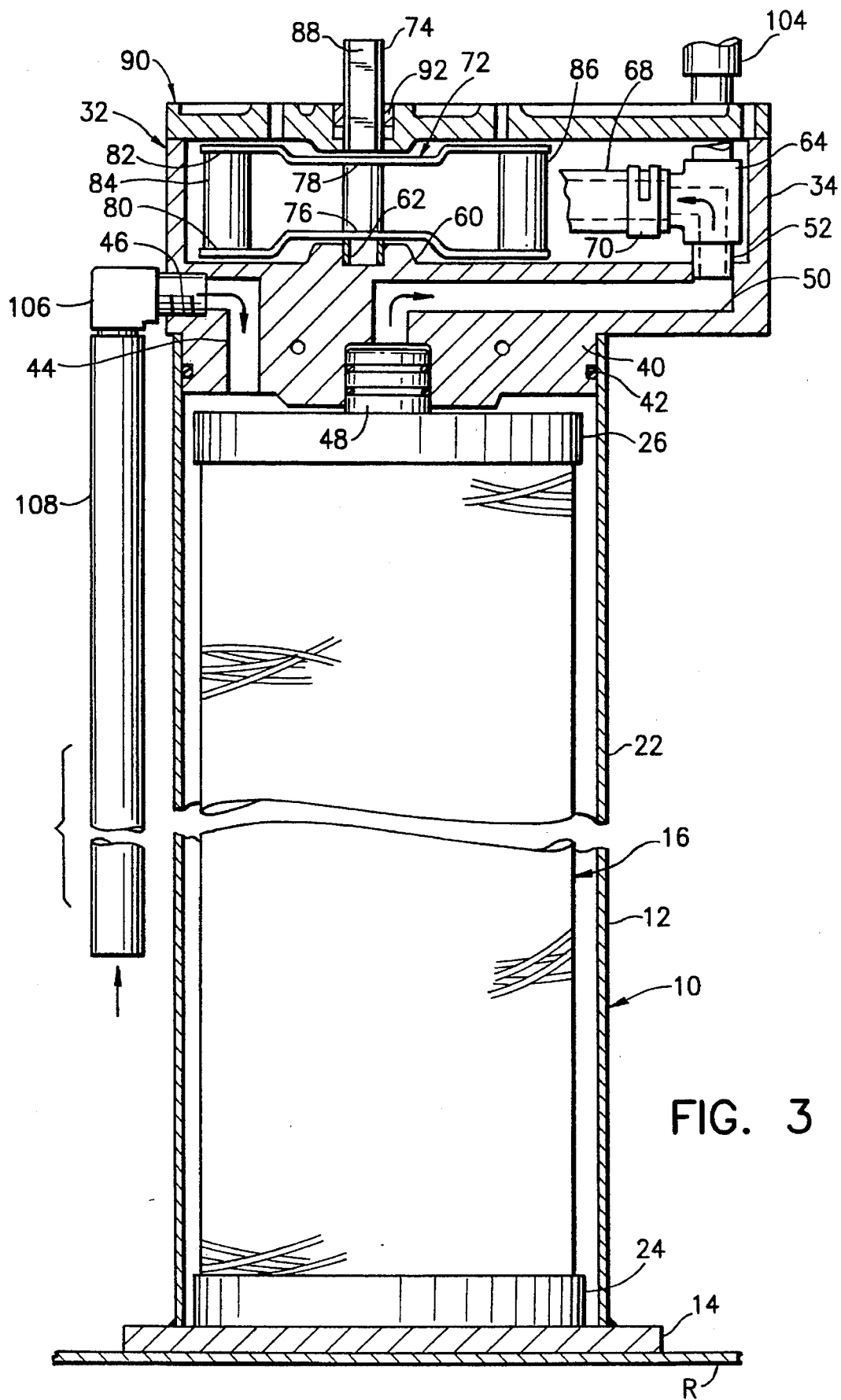
FIG. 3 is a longitudinal cross-section taken through the filter system of FIG. 2.

The filter system of this invention is contained within the reservoir R. As illustrated in FIGS. 2 and 3, it includes a housing 10 formed of a cylindrical sidewall 12 welded to a baseplate 14. Enclosed within the housing 10 is a filter assembly 16.

Figure 6:
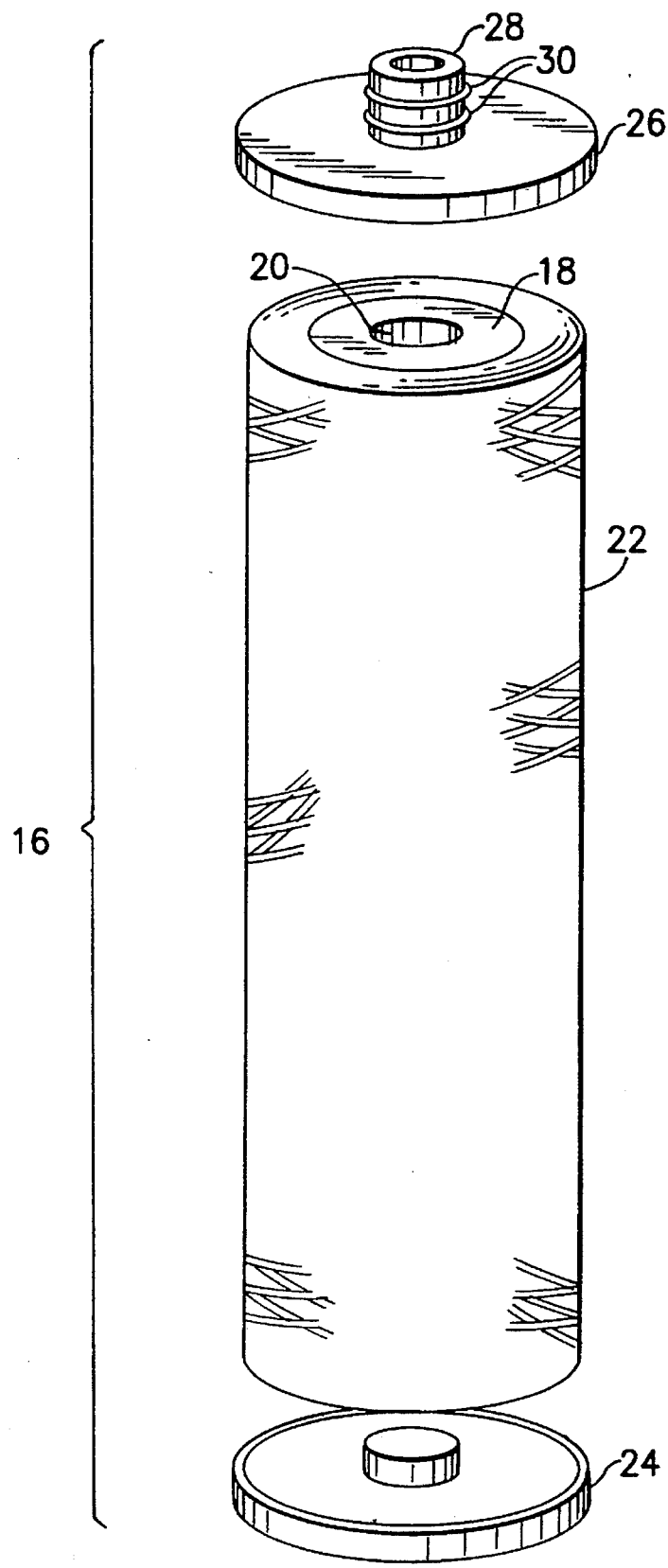
FIG. 6 is an exploded view illustrating the filter construction.

The filter assembly 16 is illustrated in the exploded view of FIG. 6. It comprises an inner cylindrical core 18 having an axial passage 20 therethrough. The core 18 is formed of adsorbents having a high affinity for heavy oils and grease, such as pillared clays, zeolites, and carbon. A preferred material is particulate activated carbon, which may be in a solid structure. It may, for example, be formed by the method and apparatus disclosed in U.S. Pat. No. 5,189,092 of Koslow, which is incorporated by reference herein.

To achieve solvent regeneration, it has been found that a filter providing both particulate and dissolved impurity reduction is required. Specifically, a filter is needed which provides nearly absolute (99%) removal of 10 μm particles in a single pass and also includes a volume of small-mesh activated carbon sufficient to effectively adsorb a broad spectrum of dissolved impurities. To achieve effective performance, the activated carbon should be composed of particles as small as possible to allow the best possible single-pass removal efficiency and kinetics. To provide this small-mesh capability, the use of an activated carbon extrusion consisting of 80×325 mesh or 50×200 mesh carbon particles in a polyethylene binder system has been found particularly effective, while conventional large-mesh carbons have been found to be relatively ineffective. Preferably, the carbon particles are about 50 mesh in size or smaller and are about 325 mesh in size or larger.

Wrapped around the core 18 is a relatively heavy layer 22 of polypropylene, cotton, or similar yarn. A bottom end cap 24 is sealed to one end of the filter assembly 16 and a top end cap 26 sealed to the other end. A central passage extends through the top end cap 26, which includes a short, upwardly extending nipple 28. The nipple 28 is grooved to carry a pair of spaced O-rings 30. The filter assembly 16 is placed within the housing 10, which is then closed by a filter head assembly 32. The outer diameter of the filter assembly 16 is less than the inner diameter of the housing 10, resulting in free space between the two components, as shown in FIG. 3.

The filter head assembly 32 comprises a pump frame 34, which may be cast of a metal such as aluminum. It comprises a wall 36 surrounding a base 38 from which depends a cylindrical plug 40. The plug 40 is dimensioned to fit snugly within the top of the housing 10 and is grooved to carry a sealing O-ring 42. An L-shaped inlet port 44 extends from the bottom of the plug 40 to a tapped opening 46 in the side of pump frame 34.

The plug 40 also defines a central passage 48, which leads into an outlet channel 50 which extends through the base 38 and terminates at a pump intake port 52. The passage 48 in the plug 40 is dimensioned to snugly receive the nipple 28 of the filter assembly and the connection is sealed by the O-rings 30.

Figure 4:
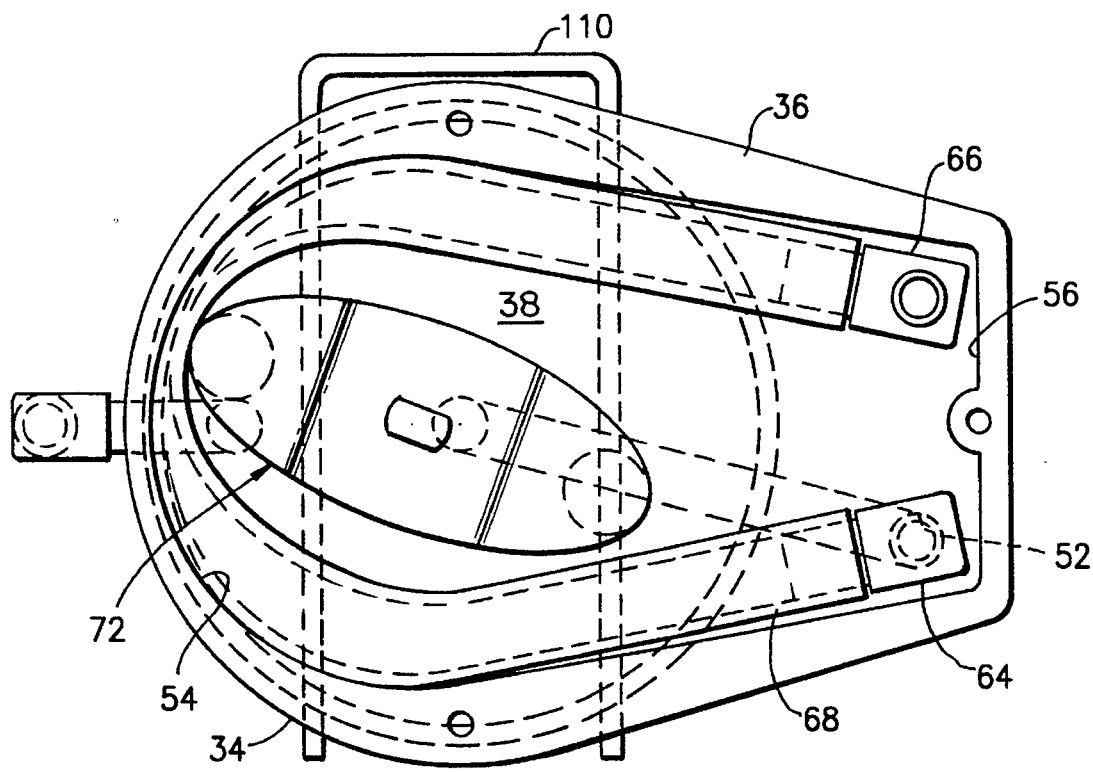
FIG. 4 is a top view of the filter system of FIG. 3 with the motor plate removed.

As will be most apparent from FIG. 4, the wall 36 of the pump frame 34 is shaped on the inside to form a semi-cylindrical surface 54 and a trapezoidal extension 56. The base 38 of the pump frame 34 includes a hole 58 (FIG. 5), which is symmetrically positioned relative to the pump intake port 52, but does not extend through the base 38. In addition, the base 38 includes a hub 60 (FIG. 3) and bearing 62 concentric with the semi-cylindrical surface 54 of wall 36.

Secured within the pump intake port 52 and the adjacent hole 58 of the base 38 are, respectively, a pump intake Tee fitting 64 and a pump outlet Tee fitting 66. The two ends of a length of plastic tube 68 are connected to the Tee fittings 64, 66 by means of conventional tubing clamps 70. The plastic tube 68 extends around the inner surface of the wall 36, lying against the semi-cylindrical surface 54 portion of the wall.

The plastic tube 68 forms one element of a peristaltic pump, the other element being a rotor 72. The rotor 72 is conventional and includes a vertical shaft 74 which rotates in bearing 62. The upper and lower ends of the shaft 74 are cut away to define spaced shoulders 76, 78, against which are mounted lower 80 and upper 82 support plates. Mounted between the ends of the upper and lower support plates are rollers 84, 86. The upper end of shaft 74 is also cut away to define a pair of opposed flats 88.

The filter head assembly 32 is closed by a motor plate 90. One opening in the motor plate 90 holds a bearing 92 for the pump rotor shaft 74. Other openings 94, 96 receive, respectively, the arms of Tee fittings 64, 66. The motor plate 90 is secured to the filter head assembly 32 by means of three easily removable thumbscrews 98. An electric motor 100 is bolted to the top of the motor plate and engages and drives the shaft 74. Connected to the vertical arm of the Tee fitting 64 is a differential pressure gauge 102. The arm of the other Tee fitting 66 connects to a hose 104 which supplies the spray nozzle N.

Figure 5:
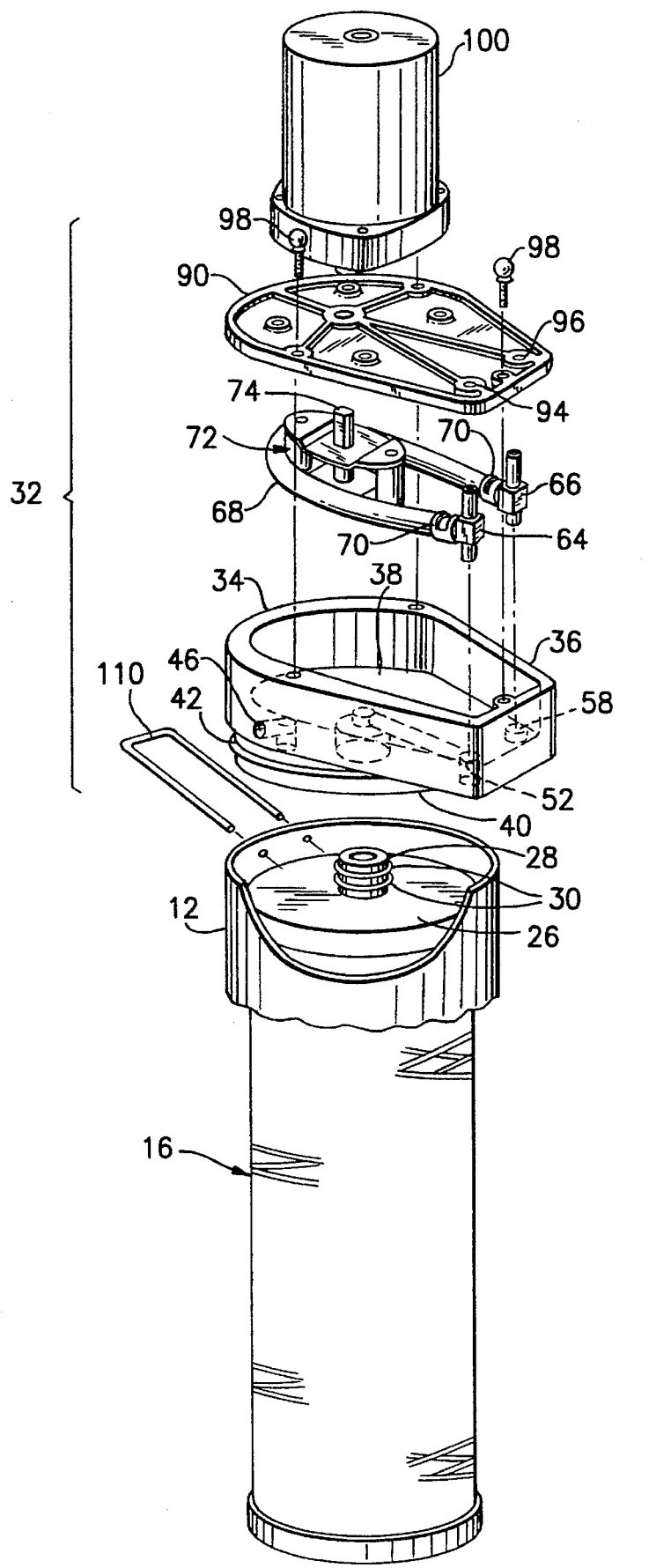
FIG. 5 is an exploded perspective view of the filter system.

Completing the structure of the filter system is an elbow 106 which screws into the tapped opening 46 in pump frame 34. The elbow 106 carries a depending intake pipe 108 which extends downwardly along the side of the housing 10. Finally, an optional U-shaped locking pin 110 may be employed as illustrated in FIGS. 4 and 5 to secure the filter head assembly 32 to the housing 10. When the filter housing 10 operates under a negative pressure, it is not necessary to secure the filter head 32 by means such as the locking pin 110.

Figure 7:
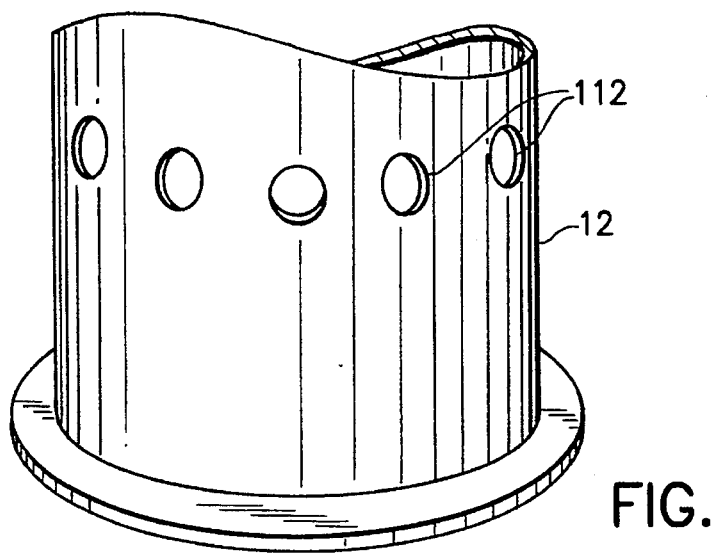
FIG. 7 is a partial view illustrating a modification of the invention.

FIG. 7 illustrates a modification which avoids the need for providing an inlet opening in the filter head assembly 32 and also dispenses with the need for the intake pipe 108. Instead, a row of intake holes 112 is drilled in the sidewall 12 of housing 10. The intake holes 112 serve the same purpose as the intake pipe, namely, admitting fluid from the reservoir into the space surrounding the filter assembly 16.

Operation

The dimensions of the filter system of this invention are not critical. However, for practical reasons, the device should fit within the reservoirs currently in use. It is suggested that this criteria can be met by a filter assembly 17" (43 cm) in length within a housing having an internal diameter of 5" (13 cm). The assembled system sits within and on the base of the reservoir R, with the solvent level L being at any desired height above the end of the intake pipe 108 or the row of holes 112.

When a part is to be cleaned, the motor 100 is activated to operate the peristaltic pump. As the pump rotor 72 turns, the rollers 84, 86 bearing against the plastic tube 68 expel a fixed volume of solvent to the spray nozzle with each rotation. Since the unit is essentially sealed from atmosphere, it is self-priming. In other words, if the motor is started when there is no liquid solvent within the plastic tube 68, it will simply expel air through the nozzle, creating a vacuum which eventually draws in the liquid.

The liquid solvent from the reservoir travels as shown by the arrows on FIG. 3. From the reservoir, it enters through the intake pipe 108 or the row of holes 112 and fills the space in the housing 10 surrounding the filter assembly 16. The solvent is drawn radially through the filter and into its axial passage 20. The solvent passes first through the yarn which has an exceedingly high dirt capacity. It also presents a large surface area to the incoming solvent and thereby resists premature failure due to the presence of gels, greases, and other substances that would tend to web over the filter medium. After passing through the yarn, the solvent passes through the solid but porous core 18 of activated carbon. This provides very efficient removal of oils, grease and other dissolved impurities. From the filter assembly 16, the solvent is pulled into the intake side of the peristaltic pump and is then expelled to the spray nozzle N.

The differential pressure gauge 102 is connected on one side to the vacuum created by the peristaltic pump and on the other side to atmosphere. (A conventional snubber may also be employed to prevent gauge fluctuations.) As a result, the differential pressure gauge 102 indicates the pressure drop across the filter, which increases with the dirt loading of the filter. In order to replace the filter it is only necessary to remove the filter head assembly 32 from the housing 10. The locking pin 110, if employed, is first removed. However, the locking pin 110 is not a necessary element because the system is normally under vacuum, which keeps the filter head assembly 32 solidly engaged with the housing 10. After removal of the filter head assembly 32, the filter assembly 16 is removed and replaced with a clean filter assembly.

It would be possible for a careless operator to overload the motor 100 by failing to replace the filter when loaded. However, the present system allows this to be avoided. This is done by employing a plastic tube 68 in the peristaltic pump which is sufficiently flexible to collapse when the vacuum reaches some preselected limit. This collapse stops the pumping action and removes most of the motor load.

The plastic tube 68 of the peristaltic pump is very easily replaced. It is merely necessary to remove the thumbscrews 98 and the motor plate 90 for access to the interior of the pump. The conventional tubing clamps 70 can then be removed for installation of a new length of tubing 68.

A peristaltic pump is favored for this application. A conventional pump, such as a centrifugal pump, has a curve of flow vs. ΔP which is very steep. Consequently, as a filter begins to load, the flow through the filter plummets rapidly. A peristaltic pump, however, is a positive displacement pump. Accordingly, the volumetric flow rate remains quite steady until a high differential pressure is reached. As a result, a constant flow of solvent is delivered to the parts cleaner nozzle until the filter reaches a relatively high level of dirt loading.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In a solvent cleaning system which includes a cleaning station, a drain leading from the cleaning station into a reservoir, and means for delivering a liquid solvent from said reservoir to said cleaning station, the improvement which comprises:

a housing positionable in said reservoir;

a two stage filter mounted within and spaced from said housing to form a first volume therebetween, said filter defining a substantially axial second volume therethrough;

a first fluid flow passage between said reservoir and one of said first and second volumes;

a positive displacement pump having an intake and a discharge mounted on said housing and forming an integral assembly therewith;

a second fluid flow passage interconnecting the other of said first and second volumes with said pump intake; and means for connecting said pump discharge to said liquid solvent delivering means.

2. The improvement of claim 1 wherein said filter is substantially cylindrical and comprises an inner core of an oil and grease adsorbent and an outer layer of fibrous filtration medium.

3. The improvement of claim 2 wherein said inner core is a solid formed of bonded particulate activated carbon.

4. The improvement of claim 3 wherein said carbon particles are smaller than about 50 mesh in size.

5. The improvement of claim 4 wherein said particles are larger than about 325 mesh in size.

6. The improvement of claim 1 wherein said first fluid flow passage connects to said first volume.

7. The improvement of claim 6 wherein said filter comprises an inner core of activated carbon and an outer layer of fibrous filtration medium.

8. The improvement of claim 7 wherein said inner core is a solid formed of bonded particulate carbon.

9. The improvement of claim 8 wherein said carbon particles are smaller than about 50 mesh in size.

10. The improvement of claim 9 wherein said particles are larger than about 325 mesh in size.

11. The improvement of claim 1 wherein said pump is a peristaltic pump.

12. In a solvent cleaning system which includes a cleaning station, a drain leading from the cleaning station into a reservoir, and means for delivering a liquid solvent from said reservoir to said cleaning station, the improvement which comprises:

a housing positionable in said reservoir;

a two stage filter comprising a solid inner core of bonded particulate activated carbon and an outer layer of fibrous filtration medium mounted within and spaced from said housing to form a first volume therebetween, said filter defining a substantially axial second volume therethrough;

a first fluid flow passage between said reservoir and said first volume;

a positive displacement peristaltic pump comprising a flexible tube and a rotor and having an intake and a discharge;

a second fluid flow passage interconnecting the second volume with said pump intake; and means for connecting said pump discharge to said liquid solvent delivering means.

13. The improvement of claim 10 wherein said tube is selected to collapse at a preselected pressure differential between atmosphere and the pump intake.

\* \* \* \* \*